(12) United States Patent
Wang et al.

(10) Patent No.: US 8,379,635 B2
(45) Date of Patent: Feb. 19, 2013

(54) METHOD, APPARATUS, AND SYSTEM FOR PROCESSING A VOICE SERVICE

(75) Inventors: Fengxin Wang, Shenzhen (CN); Kai Zhang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 356 days.

(21) Appl. No.: 12/916,101

(22) Filed: Oct. 29, 2010

(65) Prior Publication Data

US 2011/0058661 A1    Mar. 10, 2011

Related U.S. Application Data

(63) Continuation of application No. PCT/CN2009/071414, filed on Apr. 23, 2009.

(30) Foreign Application Priority Data

Apr. 30, 2008 (CN) .......................... 2008 1 0105768

(51) Int. Cl.
*H04L 12/66* (2006.01)

(52) U.S. Cl. ...................... 370/352; 370/401; 379/93.01; 379/88.17

(58) Field of Classification Search .......... 370/352–356, 370/401; 379/93.01, 88.17
See application file for complete search history.

(56) References Cited

U.S. PATENT DOCUMENTS

| | | | |
|---|---|---|---|
| 6,335,936 B1 * | 1/2002 | Bossemeyer et al. .......... | 370/420 |
| 6,414,952 B2 * | 7/2002 | Foley ............................ | 370/352 |
| 6,549,616 B1 * | 4/2003 | Binder ........................ | 379/90.01 |
| 6,690,677 B1 * | 2/2004 | Binder ........................... | 370/465 |
| 6,693,916 B1 * | 2/2004 | Chaplik et al. ................ | 370/485 |
| 6,791,993 B2 * | 9/2004 | Foley ............................ | 370/430 |
| 6,845,157 B1 | 1/2005 | Bingel et al. | |
| 7,525,990 B2 * | 4/2009 | Bossemeyer et al. ......... | 370/468 |
| 8,238,354 B2 * | 8/2012 | Bossemeyer et al. ......... | 370/401 |
| 2003/0118039 A1 | 6/2003 | Nishi et al. | |
| 2004/0107299 A1 | 6/2004 | Lee et al. | |
| 2006/0187900 A1 | 8/2006 | Akbar | |
| 2012/0294303 A1 * | 11/2012 | Bossemeyer et al. ......... | 370/352 |

FOREIGN PATENT DOCUMENTS

| | | |
|---|---|---|
| CN | 1416634 A | 5/2003 |
| EP | 1 499 100 A2 | 1/2005 |
| EP | 1499100 A2 | 1/2005 |

OTHER PUBLICATIONS

Written Opinion of the International Searching Authority in corresponding PCT Application No. PCT/CN2009/071414 (Jul. 30, 2009).
Extended European Search Report in corresponding European Patent Application No. 09737672.7 (Jul. 24, 2012).
International Search Report in corresponding International Patent Application No. PCT/CN2009/071414 (Jul. 30, 2009).

* cited by examiner

*Primary Examiner* — Creighton Smith
(74) *Attorney, Agent, or Firm* — Leydig, Voit & Mayer, Ltd.

(57) ABSTRACT

The present invention relates to a method, an apparatus, and a system for processing a voice service. The method includes: judging whether a PSTN service exists on an access line of a main node; if no PSTN service exists, closing a switch component on the access lines of the main node so that the PSTN service on a branch node is transmitted to an HGW on the main node through the switch component and the HGW converts the PSTN service into a service based on a packet format and transmits the service based on the packet format. When the PSTN service is carried on the PS domain, no information needs to be exchanged with the network side, thus preventing impact caused by the failure at the network side and improving stability of the apparatus.

11 Claims, 2 Drawing Sheets

METHOD, APPARATUS, AND SYSTEM FOR PROCESSING A VOICE SERVICE

CROSS-REFERENCE TO RELATED APPLICATIONS

This application is a continuation of International Application No. PCT/CN2009/071414, filed on Apr. 23, 2009, which claims priority to Chinese Patent Application No. 200810105768.X, filed on Apr. 30, 2008, both of which are hereby incorporated by reference in their entireties.

FIELD OF THE INVENTION

The present invention relates to the mobile communications field, and in particular, to a method, an apparatus, and a system for processing a voice service.

BACKGROUND

The last-mile broadband data access may be implemented in many modes in a communication system, and an x Digital Subscriber Line (xDSL) is a common access mode. The merit of the xDSL lies in using twisted pairs to transmit data. Therefore, the xDSL shares lines with the Public Switched Telephone Network (PSTN) instead of distributing new cables. In the service processing, services are differentiated through signal bands. Specifically, the PSTN service employs analog signals and its frequency band is generally a range that locates below 4 kHz; and the data service employs the signals on the frequency band that locates above 4 kHz. Proper filtering prevents interference between the two services.

Currently, a common type of broadband communication equipment at the customer premises is known as a Customer Premises Equipment (CPE) or Home Gateway (HGW). In an uplink direction, the CPE or HGW may be connected with the Digital Subscriber Line Access Multiplexer (DSLAM) at the Central Office (CO) through xDSL twisted pairs. In a downlink direction, the CPE or HGW may be connected with the interfaces such as Fast Ethernet (FE) interface, Universal Serial Bus (USB) interface, Plain Old Telephone Service (POTS) interface, and WiFI interface. The data is compressed within the CPE product. The downlink POTS interface may be connected with a telephone set directly. Sampling, compression and packaging of an analog signal are performed within the product, so that the analog signal is converted into a data signal compatible with the xDSL protocol, and data is exchanged with the DSLAM at the CO. In such a process, a Voice over IP (VoIP) call can be dialed through a traditional analog telephone set.

Generally, the product has a Foreign Exchange Office (FXO) interface for shifting the call from the VoIP to the PSTN. That is, when the equipment at the xDSL central office fails, all data services are impossible, but the calls attached to the POTS interface can be dialed through the PSTN line.

In the existing home telephone service system, the home telephone service system from the CO of the operator to the user is connected through a twisted pair system. The twisted pair system may bear Digital Subscriber Line (DSL) broadband data services or PSTN services. The cables of a home telephone service system are generally distributed in walls, and interfaces are led out in different rooms. (Currently, HGW is a common CPE.)

The HGW is connected with the twisted pair system through a DSL interface and enables data exchange in the uplink direction. FE interface may be connected with the devices such as computer and Set Top Box (STB) and enables access to the Internet in the downlink direction. The POTS interface may be connected with a plain telephone set or a facsimile machine and enables the VoIP function in the downlink direction. The USB interface may be connected with a printer or USB storage device and enables the relevant functions in the downlink direction. In the case of power off and no access of network, the telephone set connected with a POTS interface may implement a service of shifting a call from the VoIP to the PSTN through an FXO interface. The filter between the HGW and the twisted pair enables filtering, and prevents interference between low-frequency voice service and the high-frequency data service.

If the user only activates the data service (such as xDSL) instead of the PSTN service when the home telephone service system employs the foregoing HGW, only a first telephone set connected with the downlink POTS interface of the HGW is able to implement the telephone function (the telephone function is limited to the VoIP service), and a second telephone set and a third telephone set in other rooms are not able to implement the telephone function. If the telephone sets in other rooms also need to implement the telephone function, the cable distribution of the home telephone service system has to be modified to connect the two telephone sets to the downlink POTS interface of the HGW.

In view of the foregoing defects, the conventional art provides a solution: A detection module is added in the HGW to detect whether a PSTN service exists in the home telephone service system. If the PSTN service exists, the relay in the HGW is open, and the telephone set connected with the POTS interface and the telephone set in another room can make PSTN calls. If the data service is activated but the PSTN service is not available, the detection module reports the detection result to the CO and then closes the relay, and all telephone sets can be connected to the telephone service module of the HGW through the relay. The signals are sampled, compressed, and packaged, and converted into data streams compatible with the xDSL protocol to implement the function of making VoIP calls.

The conventional art has at least the following problems: If the DSLAM fails and thus is unable to process activation request signals, the HGW is unable to receive confirmation signals, further not able to close the relay, and therefore the telephone set is unavailable.

SUMMARY

The embodiments of the present invention provide a method, an apparatus, and a system for processing a voice service to overcome the inability of converting a service in the case of network failure in the conventional art and provide high service adaptability and stable performance.

An embodiment of the present invention provides a method for processing a voice service which includes judging whether a PSTN service exists on an access line of a main node and, if no PSTN service exists, closing a switch component on the access lines of the main node so that the PSTN service on a branch node is transmitted to an HGW on the main node through the switch component and the HGW converts the PSTN service into a service based on a packet format and transmits the service based on the packet format.

The embodiment of the present invention enables the PSTN service to be carried on a Packet-Switched (PS) domain, thus overcoming the conventional art's inability to be adaptable to different scenarios. When the PSTN service is to be carried on the PS domain, no information needs to be exchanged with the network side, thus preventing impact caused by the failure at the network side and improving stability of the apparatus.

An embodiment of the present invention provides an apparatus for processing a voice service which includes (1) a detection module, connected with the main node and configured to judge whether a PSTN service exists on an access line of the main node, (2) a switch component, configured to close if the detection module determines that no PSTN service exists, and (3) an xDSL module, configured to convert the PSTN service into a service based on a packet format when the switch component is closed, and transmit the service based on the packet format.

The embodiment of the present invention enables the PSTN service to be carried on a Packet-Switched (PS) domain, thus overcoming the conventional art's inability to be adaptable to different scenarios. When the PSTN service is to be carried on the PS domain, no information needs to be exchanged with the network side, thus preventing impact caused by the failure at the network side and improving stability of the apparatus.

An embodiment of the present invention provides a system for processing a voice service which includes a main node and at least one branch node. The main node further includes an HGW, and the HGW includes (1) a detection module, connected with the main node and configured to judge whether a PSTN service exists on an access line of the main node, (2) a switch component, configured to close if the detection module determines that no PSTN service exists, and (3) an xDSL module, configured to convert the PSTN service into a service based on a packet format when the switch component is closed, and transmit the service based on the packet format.

The embodiment of the present invention uses different bearer networks to implement a telephone service through changing the state of the switch component, overcomes a defect of poor adaptability to a service of a conventional HGW, and overcomes the inability of converting a service in the case of network failure in the conventional art. The HGW is adaptable to different services without modification of the cable layout of the home telephone service system, thus the adaptability and stability of the product are greatly improved.

DETAILED DESCRIPTION OF THE EMBODIMENTS

The technical solution under the present invention is described below in more detail with reference to the accompanying drawings and exemplary embodiments.

Embodiment 1

This embodiment provides a method for processing a voice service. The method includes:

judging whether a PSTN service exists on an access line of a main node;

if no PSTN service exists, closing a switch component on the access line of the main node so that the PSTN service on a branch node is transmitted to an HGW on the main node through the switch component and the HGW converts the PSTN service into a service based on a packet format and transmits the service based on the packet format.

The foregoing embodiment enables the PSTN service to be carried on a Packet-Switched (PS) domain, thus overcoming the conventional art's inability to be adaptable to different scenarios. When the PSTN service is carried on the PS domain, no information needs to be exchanged with the network side, thus preventing impact caused by the failure at the network side and improving stability of the apparatus.

Figure 1:
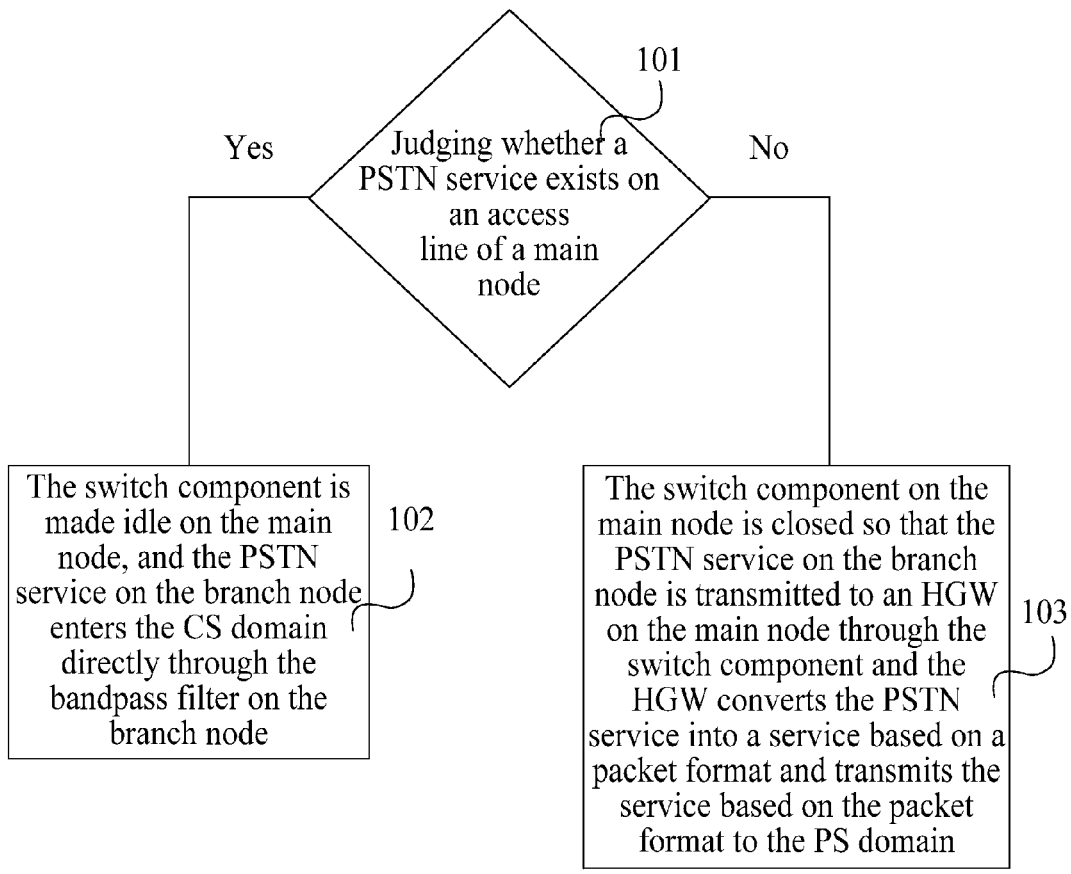
FIG. 1 is a schematic view of flowchart of the first embodiment of the present invention.

FIG. 1 is a schematic view of flowchart of the first embodiment of the present invention. As shown in FIG. 1, the embodiment includes the following steps:

Step 101: The detection module detects the voltage and the current between the access lines of the main node, and judges whether the PSTN service exists on the access lines of the main node. Specifically, the detection module detects the voltage and the current between the access lines of the main node. If the voltage between the access lines is at a first threshold, the PSTN service is in a hang-up state; if the current between the access lines is greater than or equal to a second threshold, the PSTN service is in a busy state; if the voltage between the access lines is greater than or equal to a third threshold, the PSTN service is in a ringing state; if none of the foregoing conditions is met, no PSTN service exists. After many experiments conducted by the inventor in the development process, the following is found: When the voltage between the access lines reaches 48 V DC, the telephone set is in the hang-up state; when the current between the access lines is greater than or equal to 18 mA, the telephone set is in the busy state; when the voltage between the access lines is greater than or equal to 50 Vrms, the telephone set is in the ringing state. The foregoing experimental data is obtained under relevant industrial standards of China. Under the relevant standards of other countries, the experimental data may be different, but the test principles and the solution are still the same as or similar to those under the embodiment of the present invention.

Step 102: If determining that the PSTN service exists, the detection module makes the switch component be idle on the main node. The PSTN service on the branch node enters the Circuit Switched (CS) domain directly through the low-pass filter on the branch node, and is implemented through a switch in the CS domain.

Step 103: If determining that no PSTN service exists, the detection module closes the switch component on the main node. The PSTN service on the branch node is transmitted to the HGW on the main node through the switch component. The HGW converts the PSTN service into a service based on a packet format, and transmits the service based on the packet format to the PS domain. Through the DSLAM of the PS domain, the PSTN service is implemented.

A detailed method of controlling the state of the switch component in the first embodiment is: The detection module judges whether a PSTN service exists. If the PSTN service exists, the detection module sends a signal to the processing module. The processing module sends a control signal to the switch component according to the signal sent by the detection module, and controls the state of the switch component.

In the first embodiment, when the switch component is idle, the HGW on the main node converts the PSTN service on the main node into a service based on the packet format, and transmits the service based on the packet format to the PS domain to implement the telephone service of the main node. When the switch component is closed, the HGW on the main node converts the PSTN service on the main node into the service based on the packet format, and transmits the service based on the packet format to the PS domain to implement the telephone service of the main node.

This embodiment of the present invention judges the existence of the PSTN service, and changes the state of the switch component according to the judgment result, thus fulfilling the service requirements of the branch node. If the user activates only the PSTN service, the switch component is put idle so that the service of the branch node bypasses the HGW of the main node and enters the circuit-switched network directly to implement the PSTN service of the branch node; if the user activates only the data service, the switch component is closed so that the service of the branch node undergoes the analog-digital conversion of the HGW of the main node, and then enters the packet-switched network, thus overcoming the conventional art's inability to be adaptable to different service scenarios. In this embodiment, the service requirements of the branch node are fulfilled through line switch without involving information exchange with the network side, thus reducing the defects of the user side caused by network failure greatly.

Embodiment 2

This embodiment provides an apparatus for processing a voice service. The apparatus includes:

a detection module, connected with the main node and configured to judge whether a PSTN service exists on an access line of the main node;

a switch component, which is closed if the detection module determines that no PSTN service exists; and an xDSL module, configured to convert the PSTN service into a service based on a packet format when the switch component is closed, and transmit the service based on the packet format.

The foregoing embodiment enables the PSTN service to be carried on a PS domain, thus overcoming the conventional art's inability to be adaptable to different scenarios. When the PSTN service is carried on the PS domain, no information needs to be exchanged with the network side, thus preventing impact caused by the failure at the network side and improving stability of the apparatus.

Figure 2:
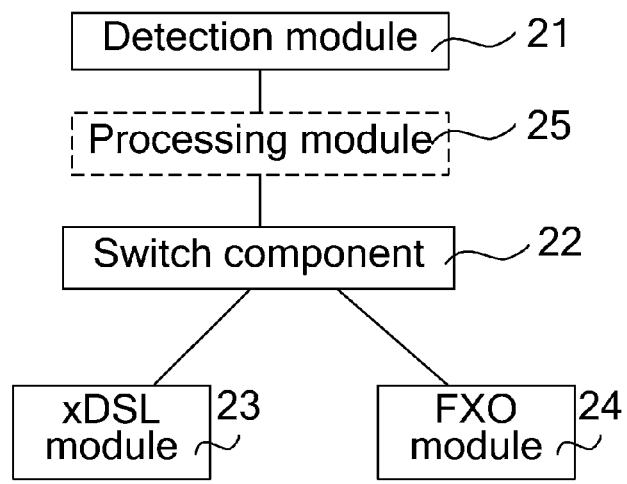
FIG. 2 shows a schematic structural view of the second embodiment of the present invention.

FIG. 2 shows a structure of the second embodiment of the present invention. As shown in FIG. 2, the apparatus includes:

a detection module 21, connected with the main node and configured to judge whether a PSTN service exists on the an access line of the main node;

a switch component 22, configured to be idle when the detection module 21 determines that a PSTN service exists or is closed when the detection module 21 determines that no PSTN service exists; and an xDSL module 23, configured to: convert the PSTN service into the service based on the packet format when the switch component 22 is closed, and transmit the service based on the packet format to the PS domain.

In this embodiment, the detection module 21 judges the existence of the PSTN service, and changes the state of the switch component 22 according to the judgment result, thus fulfilling different service requirements. Specifically, when the user activates only the data service, the switch component 22 is closed, and therefore, the telephone service of the main node or branch node is converted to a service based on the packet format, and is implemented in the PS domain. This embodiment enables the PSTN service to be carried on a PS domain, thus overcoming the conventional art's inability to be adaptable to different scenarios. When the PSTN service is carried on the PS domain, no information needs to be exchanged with the network, thus preventing impact caused by the failure at the network side and improving stability of the apparatus. The apparatus in this embodiment is equivalent to the HGW in the home telephone service system. Therefore, according to the technical revelation disclosed herein, those skilled in the art can design the foregoing apparatus as another apparatus independent of the HGW or design the foregoing apparatus into the existing HGW to enrich the functions of the existing HGW and improve the product practicality. When the service scenario changes, it is not necessary to change the cable distribution of the home telephone service system, thus facilitating the user.

In the second embodiment, a processing module 25 may be included between the detection module 21 and the switch component 22 to help the detection module 21 change the state of the switch component 22. Specifically, the processing module 25 is connected with the detection module 21 and the switch component 22, and is configured to make the switch component 22 be idle when the detection module 21 determines that the PSTN service exists and close the switch component 22 when the detection module 21 determines that no PSTN service exists. The added processing module 25 is conducive to integrated design and function upgrade of the product.

The apparatus in the second embodiment may further include an FXO module 24, which is configured to transmit the PSTN service to the CS domain when the switch component 22 is idle. In this way, the telephone service of the main node or branch node is carried on the CS domain through the FXO module 24 so that the apparatus provides diversified bearer modes for implementing the service, thus the apparatus is more adaptable to different service scenarios.

The apparatus for processing a voice service in the second embodiment may be an HGW.

Embodiment 3

This embodiment provides a system for processing a voice service. The system includes a main node and at least one branch node. The main node includes an HGW, and the HGW includes:

a detection module, connected with the main node and configured to judge whether a PSTN service exists on an access line of the main node;

a switch component, which is closed if the detection module determines that no PSTN service exists; and an xDSL module, configured to: convert the PSTN service into a service based on a packet format when the switch component is closed, and transmit the service based on the packet format.

This embodiment uses different bearer networks to implement a telephone service by changing the state of the switch component, makes the HGW highly adaptable to services, and overcomes the inability of a converting service in the case of network failure in the conventional art. The HGW is adaptable to different services without involving modification of the cable layout of the home telephone service system, thus improving the adaptability and stability of the product.

Figure 3:
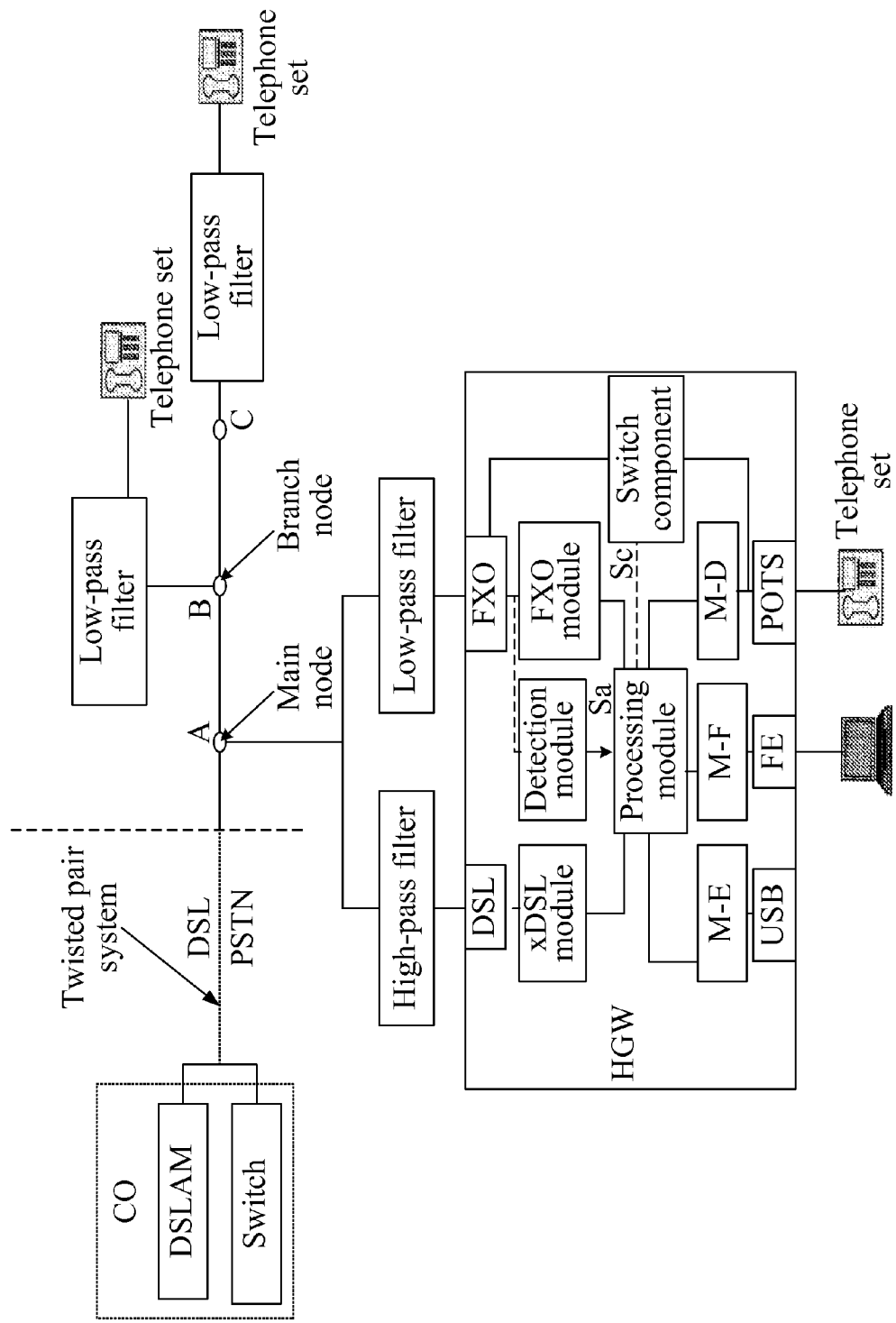
FIG. 3 shows a schematic structural view of the third embodiment of the present invention.

FIG. 3 shows a schematic structural view of the third embodiment of the present invention. As shown in FIG. 3, the system includes a main node (A in FIG. 3) and at least one branch node (B and C in FIG. 3). A telephone set and a low-pass filter are connected on the branch node, and the main node includes an HGW, a high-pass filter and a low-pass filter. The high-pass filter is connected with the DSL interface of the HGW, and the low-pass filter is connected with the FXO interface of the HGW. The HGW includes: a detection module, connected with the main node through an FXO interface and a low-pass filter and configured to judge whether a PSTN service exists on an access line of the main node; a switch component, which is connected with the detection module through a processing module, and is idle when the detection module determines that the PSTN service exists or is closed when the detection module determines that no PSTN service exists; an xDSL module, configured to: convert the PSTN service into a service based on a packet format when the switch component is closed, and transmit the service based on the packet format to the PS domain, and specifically, convert the downlink signal from the DSL interface into the signal identifiable to the processing module, and convert the uplink data from the processing module into the signal based on the packet format, namely, signal of the xDSL protocol format; a processing module, which is connected with the detection module and the switch component, and is configured to make the switch component be idle when the detection module determines that the PSTN service exists and close the switch component when the detection module determines that no PSTN service exists; and an FXO module, which is configured to transmit the PSTN service to the CS domain when the switch component is idle. M-E represents a USB module, which can be connected with a USB interface and can be connected with external devices such as printer or USB interface storage device to implement a corresponding function. The function and usage of this interface are not detailed here any further. M-F represents an Ethernet module, which can be connected with an FE/GFE interface and can be connected with external devices such as computer to implement the services such as Internet access. M-D represents a telephone module, which is connected with a downlink POTS interface and can be connected with an external device such as a telephone set. This module implements sampling, compression, and packaging of telephone analog signals, and sends the converted digital signals to the processing module.

In this embodiment, a twisted pair exists between the CO and the home telephone service system. The twisted pair can bear the data service (xDSL) and the PSTN service. The data service performs signal exchange between the HGW and the DSLAM at the CO, and the PSTN service performs signal exchange between the HGW and the switch at the CO. The PSTN service has a low frequency band which is generally below 4 Khz. The data service has a high frequency band which is generally above 4 Khz. Therefore, the two services can use twisted pairs as transmission media, and different service streams are filtered differently to overcome interference between different signals. As shown in FIG. 3, a common networking environment of the home telephone service generally involves two filters: a high-pass filter and a low-pass filter. The high-pass filter only lets the high-frequency signals pass, and filters out the low-frequency signals; the low-pass filter only lets the low-frequency signals (i.e. analog signals in the PSTN service) pass, and filters out the high-frequency signals. The high-pass filter and the low-pass filter can be integrated in an HGW or independent of the HGW.

The telephone set connected with the POTS interface can perform the VoIP function. Specifically, the signals sent by the telephone set are processed by the M-D, transmitted to the processing module, and then processed by the xDSL module and transmitted to the DSLAM at the CO.

The telephone set connected with the POTS interface can hand over from the VoIP to the PSTN in the case of power off or network interruption (DSLAM failure). The VoIP-to-PSTN process upon power off is: The signals sent by the telephone set are transmitted to the low-pass filter through the switch component, and then transmitted to the switch at the CO after passing through the main node. The VoIP-to-PSTN process upon network interruption is: The analog signals sent by the telephone set are processed by the M-D and transmitted to the processing module, and then transmitted to the FXO module and processed at the FXO module. Finally, the signals are filtered by the low-pass filter and transmitted to the switch at the CO. The service may be processed in many modes, which are not detailed here any further.

The detection module makes judgment according to different states of the PSTN service. Specifically, the voltage is generally 48 V DC when the PSTN telephone set is hung up; the current is generally greater than or equal to 18 mA when the PSTN service is busy; and the voltage is greater than or equal to 50 Vrms when the PSTN telephone set is ringing. If neither the voltage nor the current between lines meets the foregoing conditions, no PSTN service is activated in the home telephone service system.

The detection module can detect the signals from the low-pass filter, namely, detect whether any PSTN signal exists on the line. If no PSTN signal is detected, the detection module sends a Sa signal to the processing module, indicating that no PSTN service except the data service is activated in the home telephone service system. In this case, the processing module sends control signals to the switch component according to the signal sent by the detection module to control the state (for example, closed or idle) of the switch component. If the switch component is closed, the telephone sets on the branch nodes (namely, the telephone sets in other rooms) are connected to the telephone set at the POTS interface. In this case, all telephone sets can make VoIP calls. Specifically, the signals sent by the telephone set on the branch node are filtered by the low-pass filter, transmitted to the switch component (in the closed state), processed by the M-D, and transmitted to the processing module. Finally, the signals are processed by the xDSL module to be converted into data based on the packet format, and carried on the PS domain and transmitted to the DSLAM at the CO. If the detection module detects a PSTN signal and the switch component is idle, the telephone sets in other rooms can make PSTN calls. Specifically, the signals sent by the telephone set on the branch node are filtered by the filter on the branch node, carried on the CS domain, and transmitted to the switch at the CO. The telephone set connected on the HGW can implement both the VoIP service and the PSTN service by the states of the switch component.

The third embodiment uses different bearer networks to implement telephone services by changing the states of the switch component, makes the HGW highly adaptable to services, and overcomes the inability of converting services in the case of network failure in the conventional art. The HGW is adaptable to different services without involving modification of the cable layout of the home telephone service system, thus greatly improving the adaptability and stability of the product.

It is understandable to those skilled in the art that all or part of the steps of the foregoing method embodiments may be implemented by hardware instructed by a program. The program may be stored in a computer-readable storage medium. When being executed, the program performs steps of the foregoing method embodiments. The storage medium may be any medium suitable for storing program codes, for example, Read Only Memory (ROM), Random Access Memory (RAM), magnetic disk, or compact disk.

Finally, it should be noted that the above embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

The invention claimed is:

1. A voice service processing method, comprising:
    judging whether a Public Switched Telephone Network (PSTN) service exists on an access line of a main node; and
    if no PSTN service exists, closing a switch component on the access line of the main node so that the PSTN service on a branch node is transmitted to a Home Gateway (HGW) on the main node through the switch component and the HGW converts the PSTN service into a service based on a packet format and transmits the service based on the packet format.

2. The voice service processing method of claim 1, wherein:
    there are two access lines of the main node, and the judging whether the PSTN service exists is performed by detecting voltage and current between the access lines of the main node.

3. The voice service processing method of claim 2, wherein the detection of the voltage and the current between the access lines of the main node is:
    detecting the voltage and the current between the access lines of the main node;
    if the voltage between the access lines is at a first threshold, the PSTN service is in a hang-up state;
    if the current between the access lines is greater than or equal to a second threshold, the PSTN service is in a busy state;
    if the voltage between the access lines is greater than or equal to a third threshold, the PSTN service is in a ringing state; or
    if none of the foregoing conditions is met, no PSTN service exists.

4. A voice service processing apparatus, comprising:
    a detection module, connected with a main node and configured to judge whether a Public Switched Telephone Network (PSTN) service exists on an access line of the main node;
    a switch component, configured to close if the detection module determines that no PSTN service exists; and
    an x Digital Subscriber Line (xDSL) module, configured to convert the PSTN service into a service based on a packet format when the switch component is closed, and transmit the service based on the packet format.

5. The voice service processing apparatus of claim 4, further comprising:
    a processing module, configured to control a state of the switch component according to a result of the detection module.

6. The voice service processing apparatus of claim 4, wherein:
    the voice service processing apparatus is a Home Gateway (HGW).

7. A voice service processing system, comprising a main node and at least one branch node, wherein the main node comprises a Home Gateway (HGW), and the HGW comprises:
    a detection module, connected with the main node and configured to judge whether a Public Switched Telephone Network (PSTN) service exists on access lines of the main node;
    a switch component, configured to close it the detection module determines that no PSTN service exists; and
    an x Digital Subscriber Line (xDSL) module, configured to: convert the PSTN service into a service based on a packet format when the switch component is closed, and transmit the service based on the packet format.

8. The voice service processing system of claim 7, wherein the HGW comprises:
    a processing module, configured to control a state of the switch component according to a result of the detection module.

9. The voice service processing system of claim 7, wherein:
    the main node further comprises a high-pass filter and a low-pass filter.

10. The voice service processing system of claim 7, wherein:
    the HGW further comprises a high-pass filter and a low-pass filter.

11. The voice service processing method of claim 1, wherein:
    the HGW converts the PSTN service into a service based on a packet format and transmits the service based on the packet format further comprises:
    an x Digital Subscriber Line (xDSL) module in the HGW converts the PSTN service into a service based on a packet format when the switch component is closed, and transmits the service based on the packet format.

* * * * *

UNITED STATES PATENT AND TRADEMARK OFFICE
CERTIFICATE OF CORRECTION

PATENT NO.         : 8,379,635 B2  
APPLICATION NO.    : 12/916101  
DATED              : February 19, 2013  
INVENTOR(S)        : Wang et al.

Page 1 of 1

It is certified that error appears in the above-identified patent and that said Letters Patent is hereby corrected as shown below:

In the Claims:
Column 10, line 20, "close it" should read -- close if --.

Signed and Sealed this
Seventh Day of May, 2013

Teresa Stanek Rea
*Acting Director of the United States Patent and Trademark Office*